United States Patent
Schelling et al.

(10) Patent No.: US 7,036,007 B2
(45) Date of Patent: Apr. 25, 2006

(54) FIRMWARE ARCHITECTURE SUPPORTING SAFE UPDATES AND MULTIPLE PROCESSOR TYPES

(75) Inventors: Todd A. Schelling, Irmo, SC (US); Amy L. O'Donnell, Ann Arbor, MI (US); Craig M. Valine, Windsor, CO (US); William R. Greene, Fort Collins, CO (US); Bassam N. Elkhoury, Olympia, WA (US); John V. Lovelace, Irmo, SC (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/237,349

(22) Filed: Sep. 9, 2002

(65) Prior Publication Data

US 2004/0049669 A1    Mar. 11, 2004

(51) Int. Cl.
  *G06F 15/177* (2006.01)
  *G06F 9/00* (2006.01)
  *G06F 9/24* (2006.01)
(52) U.S. Cl. .............. 713/1; 713/2; 713/100
(58) Field of Classification Search .............. 713/1, 713/2, 100
  See application file for complete search history.

(56) References Cited

U.S. PATENT DOCUMENTS

| | | | |
|---|---|---|---|
| 5,210,854 A * | 5/1993 | Beaverton et al. ......... 717/174 |
| 5,835,775 A * | 11/1998 | Washington et al. ........ 717/153 |
| 5,933,652 A | 8/1999 | Chen et al. |
| 6,381,693 B1 * | 4/2002 | Fish et al. .................... 713/1 |
| 6,834,384 B1 * | 12/2004 | Fiorella et al. ............. 717/169 |
| 2001/0042243 A1 | 11/2001 | Fish et al. |
| 2002/0178352 A1 * | 11/2002 | Lambino et al. ............... 713/2 |

FOREIGN PATENT DOCUMENTS

| EP | 0 723 226 A1 | 9/1995 |
|---|---|---|
| EP | 0 939 367 A2 | 8/1998 |

OTHER PUBLICATIONS

IEEE Standard for Boot (Initialization Configuration) Firmware: Core Requirements and Practices, Bus Architecture Standards Committee, IEEE Std 1275-1994, XP-002299867.

* cited by examiner

*Primary Examiner*—Thomas Lee
*Assistant Examiner*—Ji H. Bae
(74) *Attorney, Agent, or Firm*—Blakely, Sokoloff, Taylor & Zafman LLP

(57) ABSTRACT

One embodiment of the invention provides a firmware architecture which splits firmware modules to support safe updates of specific modules as well as supporting multiple different processors. A firmware image is partitioned into several different binaries based on their update requirements and processor/platform dependence. A firmware interface table enables safe updates by enabling the option of redundant copies of specific modules as well as supporting systems with different and/or multiple processor types, mixed processors from the same family, and/or fault resilient firmware updates.

28 Claims, 5 Drawing Sheets

| Component | Attributes |
|---|---|
| Non-Specific SAL Pointer *402* | Location: Fixed<br>Context: Fixed<br>Complexity: None<br>Update: Unsafe |
| Non-Specific PAL *404* | Location: Fixed<br>Context: Fixed<br>Complexity: Low<br>Update: Unsafe |
| Non-Specific PAL *406* | Location: Fixed<br>Context: Fixed<br>Complexity: Low<br>Update: Unsafe |
| FIT Entry Pointer *408* | Location: Fixed<br>Context: Fixed<br>Complexity: None<br>Update: Unsafe |
| FIT Contains Pointers to Specific Components *410* | Location: Either<br>Context: Not Fixed<br>Complexity: Low<br>Update: Safe |
| Specific PAL *412* | Location: Not Fixed<br>Context: Not Fixed<br>Complexity: High<br>Update: Safe |
| Specific SAL *414* | Location: Not Fixed<br>Context: Not Fixed<br>Complexity: Very High<br>Update: Safe |
| Other *416* | Location: Not Fixed<br>Context: Not Fixed<br>Complexity: High<br>Update: Safe |

*Figure 4*

FIRMWARE ARCHITECTURE SUPPORTING SAFE UPDATES AND MULTIPLE PROCESSOR TYPES

FIELD

Various embodiments of the invention pertain generally to firmware architectures. More particularly, at least one embodiment of the invention relates to boot-up and/or recovery firmware modules for processors that may be safely updated and support multiple different processor types.

BACKGROUND

Modern computer architectures often include processor specific instructions as part of a startup sequence. These processor specific instructions are often employed for boot-up and/or recovery operations and may be stored in a storage device (e.g., flash storage devices, etc.).

Having the capability to update the boot-up and/or recovery sequence, components, code, binaries, and/or data permits greater flexibility in reusing these binaries in different platforms, correcting errors or bugs to existing components or binaries, and/or adding new features to existing boot-up and/or recovery sequences. The boot-up or recovery firmware is often stored as an image in a storage device (e.g., read-only memory, flash storage, etc.) from where it is accessed for processing.

For example, the current Itanium™ architecture from Intel Corp. partitions its boot-up and recovery firmware (i.e., binaries, data, code, etc.) into several distinct logical components, layers, or services. For instance, the "Processor Abstraction Layer" (PAL) components provide services directly related to the processor and insulates the remainder of the firmware from any processor-specific requirements. The "System Abstraction Layer" (SAL) provides the services necessary to configure the particular chipset and all other platform-specific functions. Layers may be divided into type "A" and type "B" components. In general, type "A" components (e.g., PALA and SALA) typically provide a minimum set of operations required for a recovery operation and type "B" components (e.g., PALB and SALB) typically extend the type "A" component operations to provide full boot-up support.

Typically, PAL components are specific to each processor. Thus, each processor type may require a different PALA/PALB combination.

An Itanium™ processor will not function without the PAL firmware. Additionally, the PAL actually contains the reset vector (as well as other hardware vectors) which is employed for boot-up and/or recovery. For these reasons, the PAL is located at a fixed address. FIG. 1 is a block diagram illustrating a prior art implementation of a boot-up or restart sequence. A computer, system, or processor is typically configured to start by accessing a fixed vector (e.g., reset vector) location 102 which points to the starting address for the boot-up or restart procedure. In the PAL/SAL architecture illustrated, a single, fixed pointer (106) into the SAL component is provided to the PAL providing a discoverable entry point for SAL services. The PAL is executed as a result of the processor reset. Once the PALA has examined and validated critical processor related resources (including PALB), control will be passed to the SALA (at pointer 106.) The SALA (108) then performs its own set of system resource and system firmware validation. Invocation of subsequent components or services (110) is performed as necessary to boot or recover the system.

As features are added or bugs are discovered in the boot-up and/or recovery procedures, it is often desirable to upgrade the PAL and/or SAL components to include these new features, services, and/or fixes. This may be accomplished by re-flashing the memory or storage location(s) or blocks where the PAL and/or SAL components are stored. That is, the affected PAL and/or SAL components in the firmware are updated and/or replaced with different components.

However, a side effect of having a single fixed address or location for the reset vector (e.g., 102) and SAL entry point (e.g., 106) is that any unexpected event or interruption (e.g., a power failure, etc.) in the update of the PAL and/or SAL has the potential to render the system useless. The interruption can be any event that occurs during a firmware update that does not allow the update to fully complete thus having the potential to render the system fully or partially useless or corrupt. For example, if an interruption occurs during the re-flashing process, the reset vector or other fixed address PAL and/or SAL components may become corrupt and make the processor inoperable.

Some platform-based solutions exist that allow fault resilient PAL updates but require significant additional Bill of Materials (BOM) cost to support redundant flash components or require significant chipset modifications to provide addresses aliasing.

It can also be seen that if the PAL is processor-specific and must be located at a fixed address, a given firmware image may only support a single processor type at a time. Switching between processor types would require updating (e.g., re-flashing) the fixed PAL area with a PAL that supports the new processor. This updating of fixed-location PAL components has the potential to result in significant downtime, a catastrophic failure, or corruption if the PAL firmware update is interrupted, halted due to an unexpected event, or if the wrong PAL firmware is used during the update.

BRIEF DESCRIPTION OF THE DRAWINGS

FIG. 4 is a table illustrating some of the attributes of the PAL and SAL components described in FIG. 3 according to one implementation of the invention.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well known methods, procedures, and/or components have not been described in detail so as not to unnecessarily obscure aspects of embodiments of the invention.

In the following description, certain terminology is used to describe certain features of one or more embodiments of the invention. For instance, "firmware" includes any type of embedded information, such as data, control or configuration information, instructions, and code. The term "PAL" is employed generically to refer to PALA and PALB components. Similarly, the term "SAL" is employed generically to refer to SALA and SALB components. The term "component" includes logically and/or physically distinct modules, binaries, data, code, and/or executable instructions. The phrase "firmware image" includes a block or group of one or more components. The terms "generic" and "non-specific" are used interchangeably to refer to components that may be employed (e.g., executed) by more than one processor type. The term "specific" (e.g., "processor-specific") is used to refer to those components that are particular to one processor type. The term "updateable" is used to refer to firmware components that may be safely updated without the risk of catastrophic failure.

One aspect of an embodiment of the invention provides a method, system, and device to improve updating, upgrading, and/or repairing embedded core processes (i.e., recovery and/or boot-up firmware). In one implementation of the invention, recovery and/or boot-up components (e.g., firmware code, functions, etc.) are divided, logically or otherwise, so as to permit safe, fault-resilient updates to portions firmware components that are the most likely to change between processor or system models.

Another aspect of an embodiment of the invention provides a method, system, and device to support multiple processor types or models with a single firmware image. In one implementation of the invention, one or more firmware interface tables (FIT) are employed to support multiple processor types with a single firmware image. Generally, an FIT is one of multiple possible ways for a non-specific firmware component(s) to find, search, and/or locate a processor-specific firmware component(s). This aspect of the invention is particularly useful for supporting systems with multiple processor types/steppings, mixed processors (e.g., processors from the same family), and/or fault resilient firmware updates. An exemplary FIT may include names or identifiers of one or more processors and their respective storage or memory location (e.g., pointer).

Figure 1:
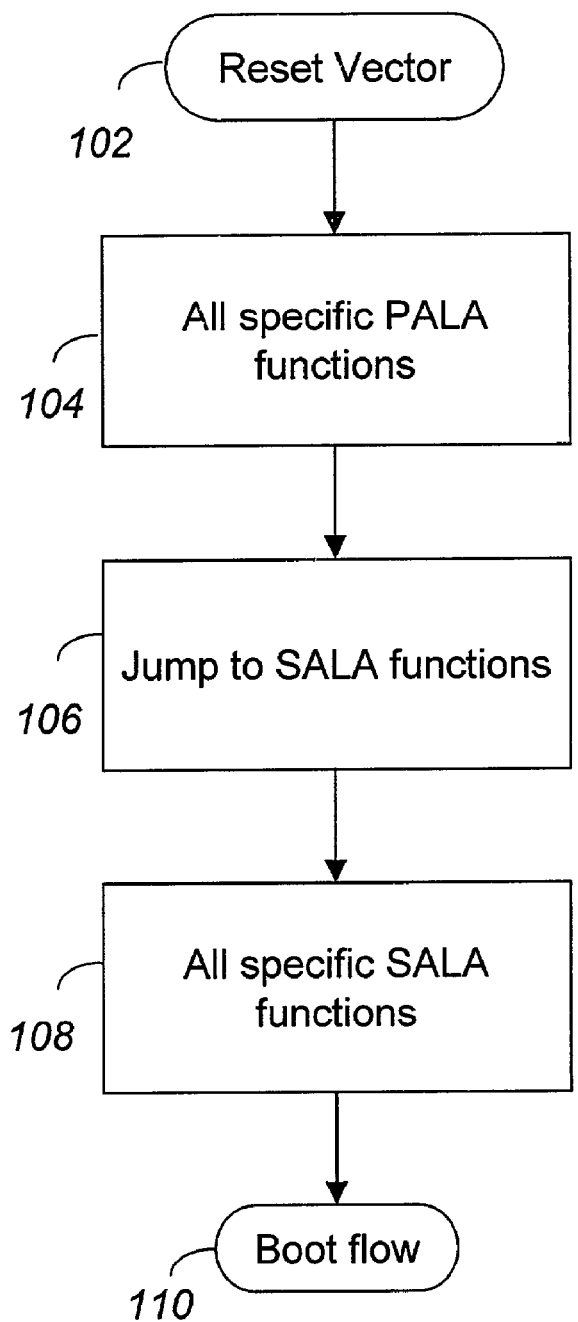
FIG. 1 is a flow diagram illustrating one embodiment of a conventional startup or reboot process.
Figure 2:
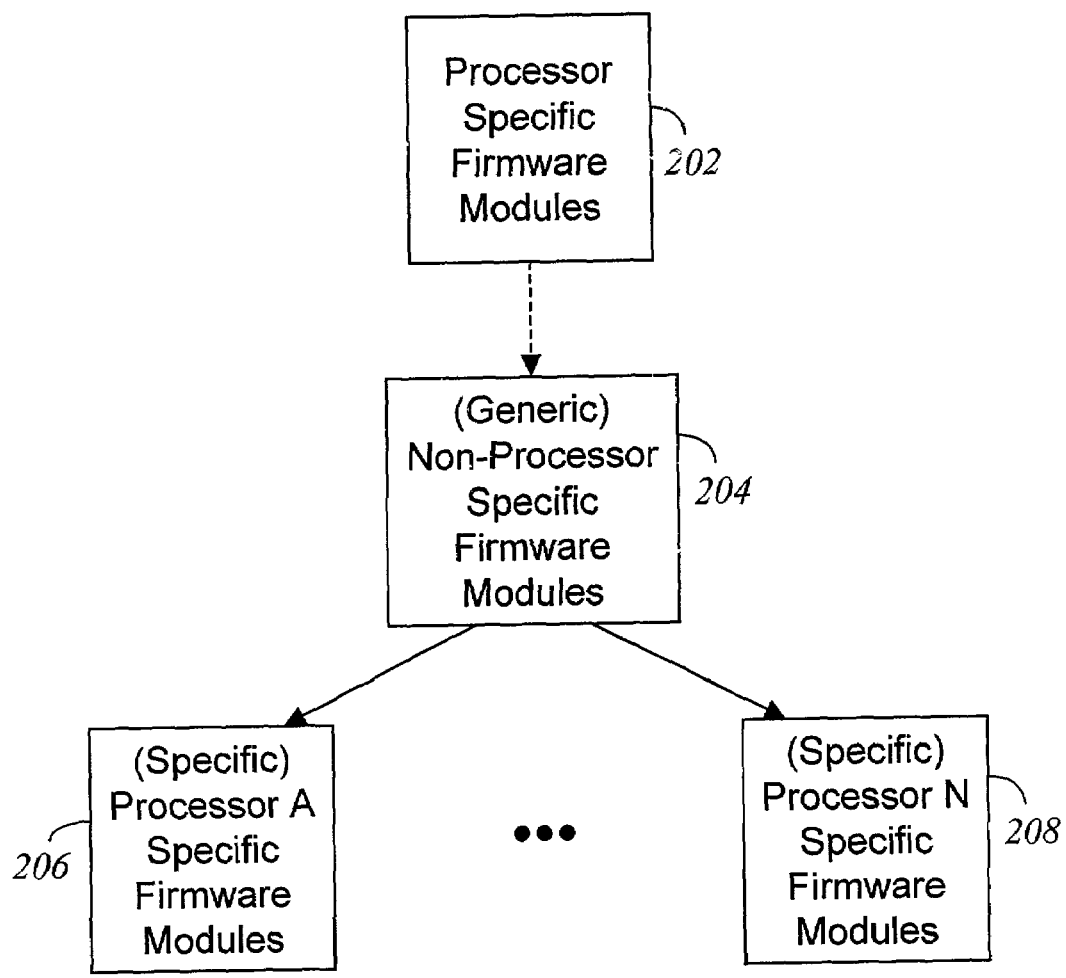
FIG. 2 is a block diagram illustrating how a firmware image may be partitioned and/or rearranged into multiple firmware components according to one implementation of the invention.

FIG. 2 is a block diagram illustrating how one implementation of the invention partitions or rearranges a system of multiple firmware components 202 (e.g., boot-up or restart firmware instructions), which are originally grouped together by specific attributes (e.g., processor-specific firmware instructions), into firmware components with non-specific attributes 204 (e.g., non-processor specific functions) and firmware components with updateable and specific attributes 206 and 208 (e.g., processor-specific functions). In general, firmware components are partitioned, divided, and/or grouped based on such criteria as likelihood of need to update, criticality of the component (e.g., code) to the system, and/or the common functions.

According to one aspect of an embodiment of the invention, firmware modules may be divided into a generic firmware component 204 and one or more processor-specific firmware components 206 and 208. The generic firmware component 204, e.g., those components that may not be safely updated and/or have fixed-address locations, may include instructions, functions, and/or operations that may be common to a number of different processor types or other electronic devices (e.g., chip set types). Additionally, the generic firmware component 204 may utilize a structured discovery mechanism. This structured discovery mechanism may include an intermediate search and handoff function to one or more dynamically updateable, less generic (e.g., more processor specific), modules. In one implementation of the invention, this search and handoff function may include a table and/or instructions to direct a particular processor to a corresponding processor-specific firmware component 206 or 208.

Such partitioning between generic and specific firmware components reduces the size of the critical and/or unupdateable generic components thereby permitting greater flexibility in updating processor-specific components while minimizing the risk of catastrophic failure during updates. Additionally, the structured discovery mechanism also provides a way to support multiple different processor types with a single firmware image.

Figure 3:
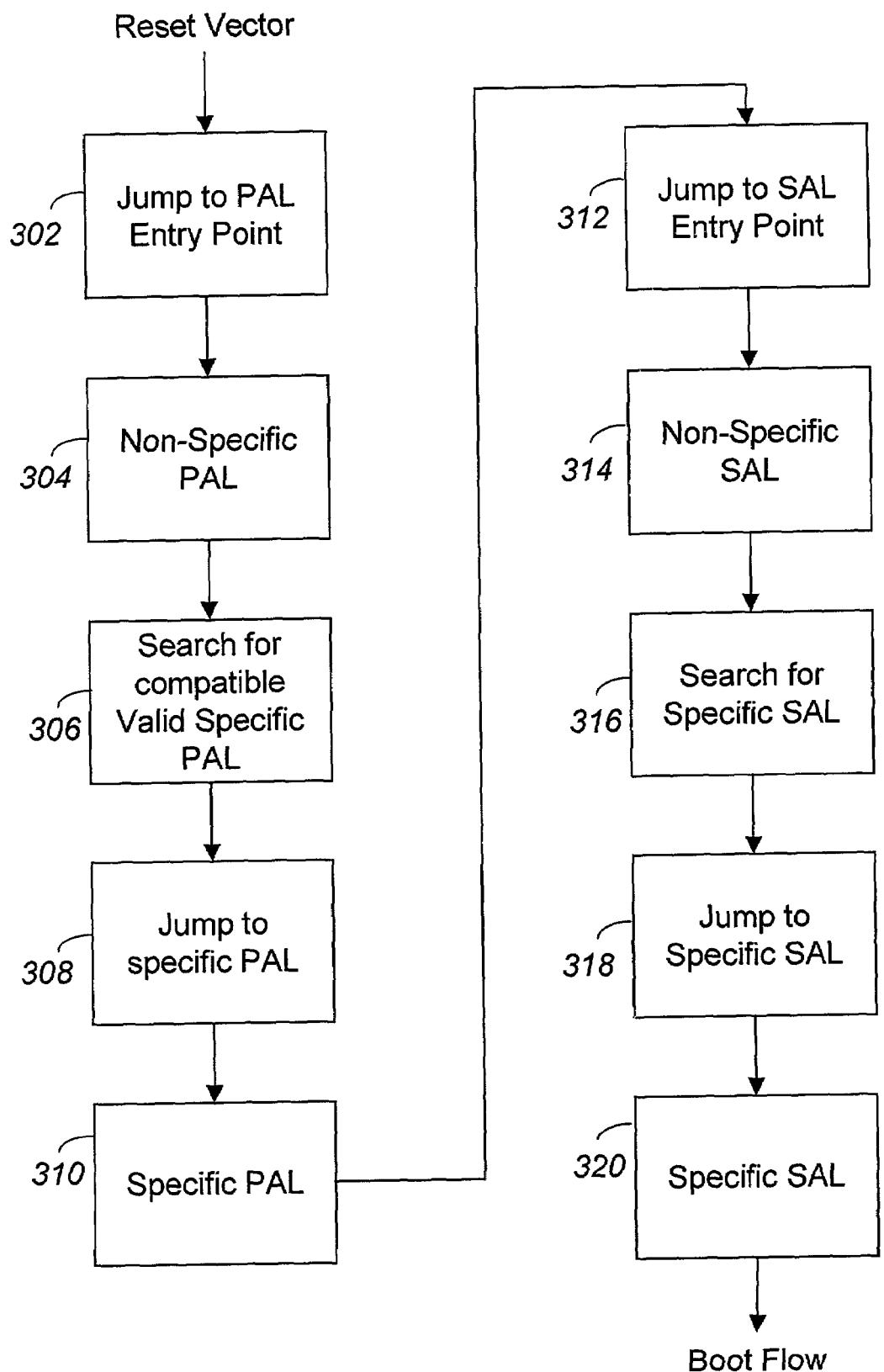
FIG. 3 is a flow diagram illustrating a startup or reboot process according to one implementation of the invention.

FIG. 3 is a block diagram of a system recovery and/or boot-up firmware module illustrating how a firmware module may be divided into several different binaries according to their update requirements and processor or platform dependence. While this example describes how the PAL and SAL firmware components typically employed in the Itanium™ architecture may be partitioned according to the invention, it should be clear that the invention is not limited to said architecture and may be employed in other systems and architectures.

When a system is started or reset its processor typically jumps to a reset vector location (e.g., an address) inside the firmware code. According to one embodiment of the invention, the reset vector jumps to a PAL entry point 302. From the entry point, non-specific PAL components are accessed first 304. The non-specific PAL components are non-processor specific and may include a minimum amount of code to perform any required processor initialization operations. For example, these components may include workarounds or fixes, authentication algorithms, and/or processor identification routines. The non-specific PAL component (e.g., including instructions, and/or data) may be executed by various types of processors.

In one implementation of the invention, the non-specific PAL may include a component to search for a valid specific PAL compatible with a particular processor type 306. That is, the non-specific PAL may include code, instructions, and/or data to identify the current processor being used and may utilize a table to determine if a processor-specific PAL component(s) is available for such processor. In one embodiment of the invention, a firmware interface table (FIT) may be employed to search for the existence of specific components for a particular processor or processor type and its corresponding location.

In one implementation of an embodiment of the invention, an FIT has one or more entries that include a type field that identifies components (e.g., processor-specific PAL components) and their entry points (e.g., location or address for each component). These entries include pointers, or other reference, to possible candidates for a processor-specific PAL component. However, in one implementation, an FIT entry may not identify the particular processor type or processor family the entry corresponds to. Thus, a processor parses through one or more entries and their corresponding components to determine if the correct processor-specific component (e.g., PAL) has been found. For example, a generic PAL uses the entry point to make sure an entry is an authentic PAL (i.e. valid, not corrupted) and uses some information within the specific PAL component or image corresponding to said entry to determine the processor type it corresponds to. If the desired processor-specific PAL is not found, then the next entry in the FIT is searched, and the corresponding processor-specific component queried or searched, until the correct component is found or there are no more entries. In other implementations, the FIT contains a field identifying the processor type or processor family a particular entry corresponds to, thereby avoiding the need to access each processor-specific component to identify the correct one.

If a corresponding specific PAL component is found for the processor, then a jump is made to this specific PAL component 308. Processor-specific PAL components, also referred to as "specific PAL" components, may include those functions, instructions, initialization procedures, and/or other firmware components which are specific to a particular processor or processor type 310.

Once the processor-specific PAL components have been executed, it may proceed to a second jump vector location 312. The second jump vector 312 directs the processing to SAL components 314.

As with the PAL components, the SAL components can be split into multiple components providing platform-non-specific and platform-specific components or binaries. Again, the platform-non-specific SAL 314 may handle all supported chipset and processor types or steppings. The platform-non-specific SAL (e.g., a generic firmware component) may utilize a discovery mechanism, such as a firmware interface table (FIT), to search and discover compatible platform-specific SAL components for a particular processor or system configuration, if any 316.

When a compatible platform-specific SAL component is found, a jump is made to the starting address for said platform-specific SAL component 318. The platform-specific SAL services may then be executed 320. Once the specific SAL component is executed, the boot-up and/or recovery procedure continues with its regular path by processing any remaining startup instructions and/or components.

FIG. 4 is a table illustrating the partitioning and attributes of the various firmware components described in FIG. 3.

A non-specific SAL pointer 402 would typically have a fixed storage location and content, since updating or changing its location risks catastrophic failure. The SAL pointer serves to provide the starting address to the non-specific SAL. If an update of the non-specific SAL pointer were to fail, it would prevent SAL components from being found and/or accessed.

A generic, non-specific PAL 404 includes codes, initialization routines, and other components common to all supported processors. In one implementation, the size and number of functions of the non-specific PAL 404 may be minimized to provide greater flexibility in updating the system. In particular, the size or function of the non-specific or generic PAL 404 is minimized in order to reduce the chances it contains errors or needs enhancements, and, consequently, reduce the need to update it. However, because the starting address of the non-specific PAL 404 is typically referenced by the reset vector, its address may need to be a fixed location in some implementations. In another implementation, the address of the non-specific PAL 404 need not be at a fixed location. Additionally, because updating the non-specific PAL risks catastrophic failure if unsuccessful, it is generally risky to update its content.

Like the non-specific PAL 404, the non-specific SAL 406 should have a fixed location and fixed content, since catastrophic failure is risked by updating the non-specific SAL. Typically, the non-specific SAL pointer 402 is unupdateable and contains a fixed address to the non-specific SAL 406.

The firmware interface table (FIT) entry pointer 408 provides a pointer to the FIT so that non-specific components (e.g., 404 and 406) can access the specific components. The FIT entry pointer 408 typically has a fixed storage location and fixed content (e.g., a storage or memory address). It is risky to update the non-specific PAL FIT entry pointer 408 since doing so risks catastrophic failure if the update was to fail. Since the FIT entry pointer 408 provides the location for the FIT, a failed FIT entry pointer update would prevent the system from booting.

Generally, a firmware interface table (FIT) 410 contains pointers to processor-specific components. For example, the FIT 410 may provide a list of processor types and the corresponding locations for their code or instructions. In one implementation, the FIT entry pointer 408 is stored at a fixed location. The FIT 410 is not at a fixed location but rather is located at whatever address is specified by the FIT entry pointer 408. However, once FIT entry pointer 408 is specified or programmed it is risky to change this value, and hence, the location of the FIT 410 is fixed after that. However, the content of the FIT may still be safely updated using various schemes, some of which are described herein.

One or more specific PAL components 412 and one or more specific SAL components 414 may support multiple different processor types. The specific PAL components 412 and/or specific SAL components 414 need not have a fixed location and their content may be updated as desired.

When updating specific PAL 412 and/or specific SAL 414 components, several approaches may be used for maintaining consistency with the FIT. Two novel approaches for performing safe updates of the specific PAL and/or specific SAL components are herein described for illustration purposes.

In a first implementation of the invention, the FIT includes fixed address and length fields for the specific PAL/SAL components. The length fields may be padded to allow for expansion. In one implementation of the invention, there may be additional dummy and/or unused entries in the FIT to allow for entire new components to be added without having to change the size of the FIT table. That is, the unused entries may be subsequently used by placing new components in the fixed address or location referenced by said previously unused entry. Replacing or updating specific components (e.g., processor-specific PAL/SAL) merely requires inserting the updated component (e.g., code) at the fixed address allocated for said specific component and keeping the length of the component within the fixed length specified in the FIT. In one implementation, a previous version of a processor-specific PAL/SAL component is maintained until the updated version of the component has been authenticated. For example, the updated version may be associated with an unused entry in the FIT and loaded in the corresponding address space referenced by said unused entry. Once the updated component has been authenticated, the previous version may be removed.

In a second implementation of the invention, redundant FITs may be utilized. In this approach, two FITs are maintained, for instance, a primary FIT and a secondary FIT. When a component is updated, the primary FIT is updated first with the location, size and/or attributes of the component. If the FIT update fails, the secondary FIT (backup FIT) is present and can be used to locate the old locations of the components or an entirely separate redundant set of components. Once the primary FIT update has completed successfully, the secondary FIT is updated to maintain coherency. In one implementation, the FIT table has a checksum that helps identify if an FIT update to the primary FIT has failed. If such failure is determined, then the secondary FIT is used rather than the primary FIT. Also, where a particular processor-specific component cannot be found in the primary FIT, then the secondary FIT is searched.

In one implementation of redundant FIT tables, there are two FIT entry pointers, e.g., a primary FIT entry pointer and a secondary FIT entry pointer, each pointing to an FIT table, the primary FIT and the secondary FIT, respectively. Upon start-up, a processor will typically use the primary FIT entry pointer to access the primary FIT. However, when a problem is encountered during the start-up process (e.g., invalid primary FIT, invalid primary FIT header check, etc.) the secondary FIT is invoked instead. When the secondary FIT is invoked, a code may be set indicating to the subsequent SAL component that there is a problem with the primary FIT. The SAL component may then correct errors in the primary FIT. However, updating the primary FIT entry pointer is still risky since a programming error or interruption during the entry pointer update could cause the system to hang. While in previous embodiments of the invention it was risky to update an FIT entry pointer, in this embodiment of the invention an FIT entry pointer (e.g., primary FIT entry pointer) as well as the FIT (e.g., primary FIT) may be safely updated since a backup pointer and table (e.g., secondary FIT entry pointer and secondary FIT) may be used to correct or repair errors that may occur when updating an FIT entry pointer and/or FIT. For instance, a checksum may be used to determine if an entry pointer and/or table are valid.

In various implementations, processor-specific components, such as 412 and 414, may be safely updated without the risk of catastrophic failure. Since the non-specific component(s) includes a discovery mechanism by which to identify processor-specific components (e.g., a firmware interface table), more than one copy of processor-specific components may be stored (e.g., in the flash memory). This provides the potential for redundant copies of each component. Updates or changes to processor-specific components (e.g., specific PAL or SAL binaries) can now be performed on a single component copy at a time. This guarantees that a valid processor-specific component will be available at all times and allows updates of a previously un-updateable large critical section of firmware code. In another implementation, redundant copies of the firmware image, each including one or more processor-specific components, are maintained with only one FIT table. For instance, an updated component loaded and associated with an unused entry in the FIT, and once the updated component is authenticated, the previous version of the component is removed.

Figure 5:
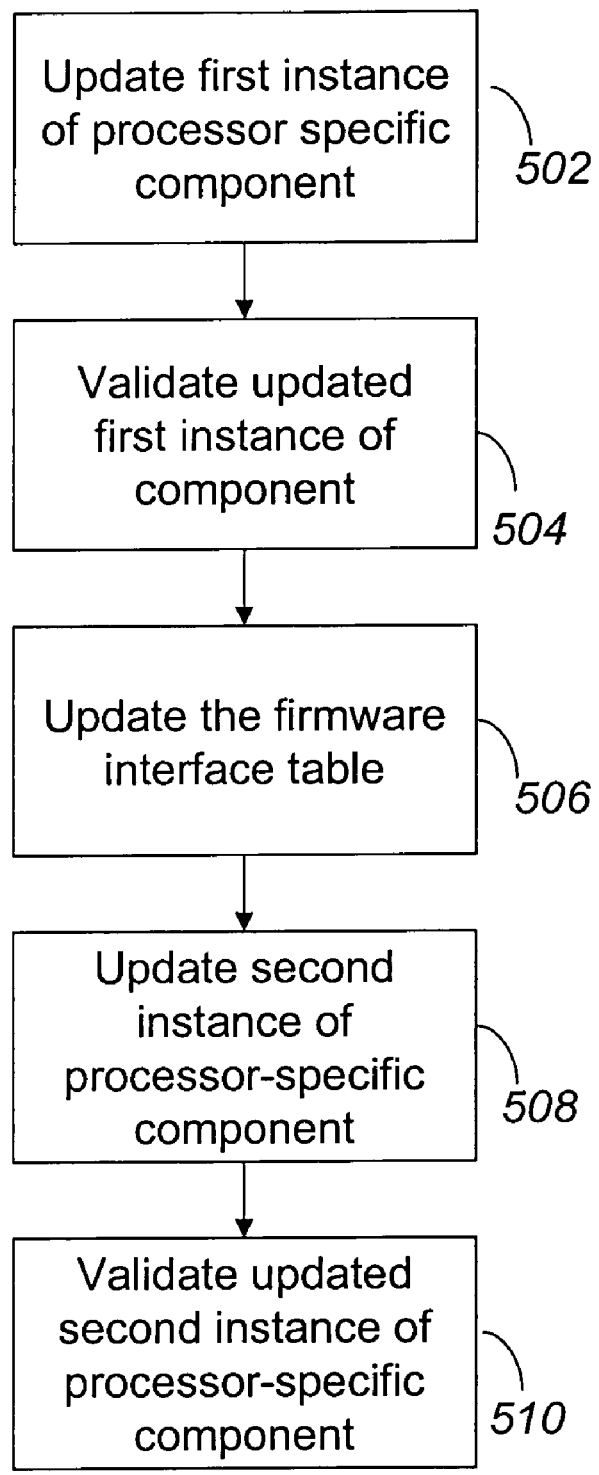
FIG. 5 is a flow diagram illustrating a method for updating processor-specific components according to one embodiment of the invention.

FIG. 5 is a flow diagram illustrating a method for updating processor-specific components according to one embodiment of the invention. While an entry in a firmware interface table (FIT) references a second instance or copy of a processor-specific component or binary, a first instance of the component or binary is changed, updated, and/or modified as desired 502. The updated first instance of the processor-specific component may be validated to assure that no problems have occurred (e.g., that it was correctly updated, that the correct binary was used, etc.) 504. In one implementation, after validation, the firmware interface table (FIT) may be updated to reference the updated first instance of the processor-specific component 506. Then the second instance of the processor-specific component may be updated 508 and validated 510.

It should be noted that the non-specific components (e.g., such portions of the PAL and/or SAL) still cannot be updated for the same reasons as stated previously (e.g., risk of catastrophic failure) but, the sizes and functions of these components are minimized.

Thus, as illustrated in the examples and embodiments described above, firmware architectures may be modified, arranged, or configured to allow safe updates to portions of firmware components that are the most likely to change between processor or system models (e.g., processor-specific components or binaries), thus avoiding downtime and/or the risk of catastrophic failure if the update is interrupted, halted due to an unexpected event, or the wrong component or firmware image is updated.

Additionally, the different aspects of the embodiments of the invention described, permit supporting multiple processors with a single firmware image. For instance, whereas a conventional firmware image in memory (e.g., flash memory) may only support a single processor type at a time, one aspect of an embodiment of the invention provides a firmware architecture that supports multiple processor types. Since the non-specific component(s) includes a discovery mechanism to search the FIT for the specific components, multiple different copies of these processor-specific components may be stored in the same firmware image (e.g., in flash memory or storage). This allows for multiple processor types to be supported by a single firmware image which was not previously possible with conventional firmware architectures. In this new architecture, the non-specific component (e.g., PAL or SAL) searches for the proper processor-specific component (e.g., PAL or SAL) based on the processor types found in the system. This allows switching between processors in a much more user-friendly way than under the conventional firmware architectures. Moreover, when hot add or hot swap processor technology becomes available, the newly added processor can be supported by firmware architecture described herein.

The different aspects of embodiments of the invention described above may be performed without the cost of supporting redundant flash devices and does not require chipset modifications.

While certain exemplary embodiments have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. For example, while this disclosure describes a specific application for PAL and SAL firmware components, the concept is not solely limited to these specific components or software examples. Additionally, it is possible to implement the embodiments of the invention or some of their features in hardware, programmable devices, firmware, software or a combination thereof.

What is claimed is:

1. A method comprising:
   providing a generic firmware module in a firmware image, the generic firmware module including instructions that are executable by multiple different processor types;
   providing a firmware interface table which includes a plurality of fixed addresses for a like plurality of modules in the firmware image, the generic firmware module capable of searching the firmware interface table for updateable processor-specific firmware modules;
   providing an undateable processor-specific firmware module in the firmware image at a first fixed address provided in the firmware interface table while leaving one or more fixed addresses provided in the firmware interface table unused; and providing a replacement processor-specific firmware module for the undateable processor-specific firmware module in the firmware image at a second fixed address in the firmware interface table selected from the one or more unused fixed addresses provided in the firmware interface table.

2. The method of claim 1 wherein the updateable processor-specific firmware module is further updateable by
validating the content of the replacement processor-specific firmware module.

3. The method of claim 1 wherein the undateable processor-specific firmware module is further updateable by
removing the updateable processor-specific firmware module after validating the content of the replacement processor-specific firmware module.

4. The method of claim 1 wherein updating the undateable processor-specific module includes,
providing the replacement processor-specific firmware module for the same processor type as the updateable processor-specific firmware module.

5. The method of claim 1 wherein the generic firmware module includes one or more instructions for initializing the multiple different processor types.

6. The method of claim 1 wherein a processor-specific firmware module includes one or more instructions for initializing a particular processor type.

7. The method of claim 1 wherein the firmware interface table includes one or more length fields.

8. The method of claim 7 wherein the replacement processor-specific firmware module has a length that is within the length field associated with the second fixed address provided in the firmware interface table.

9. A device comprising:
an electronic storage device including,
a generic firmware module in a firmware image, the generic firmware module including instructions that are executable by multiple different processor types,
a firmware interface table which includes a plurality of fixed addresses for a like plurality of modules in the firmware image, the generic firmware module capable of searching the firmware interface table for the one or more updateable processor-specific firmware modules;
an updateable processor-specific firmware module in the firmware image located at a first fixed address provided in the firmware interface table such that one or more fixed addresses provided in the firmware interface table are unused; and
a replacement processor-specific firmware module for the undateable processor-specific firmware module in the firmware image located at a second fixed address in the firmware interface table selected from the one or more unused fixed addresses provided in the firmware interface table.

10. The device of claim 9 wherein the undateable processor-specific firmware module in the electronic storage device is further updateable by
validating the content of the replacement processor-specific firmware module.

11. The device of claim 9 wherein the updateable processor-specific firmware module in the electronic storage device is further updateable by
removing the updateable processor-specific firmware module after validating the content of the replacement processor-specific firmware module.

12. The device of claim 9 wherein updating the updateable processor-specific firmware module includes,
providing the replacement processor-specific firmware module for the same processor type as the updateable processor-specific firmware module.

13. The device of claim 9 wherein the generic firmware module in the data storage device includes
one or more instructions for initializing the multiple different processor types.

14. The device a claim 9 wherein a processor-specific firmware module includes one or more instructions for initializing a particular processor type.

15. A system composing:
an electronic storage device including,
a generic firmware module in a firmware image, the generic firmware module including instructions that are executable by multiple different processor types,
a firmware interface table which includes a plurality of fixed addresses for a like plurality of modules in the firmware image, the generic firmware module capable of searching the firmware interface table for processor-specific firmware modules,
an undateable processor-specific firmware module in the firmware image located at a first fixed address provided in the firmware interface table such that one or more fixed addresses provided in the firmware interface table are unused, and
a replacement processor-specific firmware module for the undateable processor-specific firmware module in the firmware image located at a second fixed address in the firmware interface table selected from the one or more unused fixed addresses provided in the firmware interface table; and
a processor coupled to the electronic storage device, the processor to execute one or more instructions in the generic firmware module, and one or more instructions in one of the updateable processor-specific firmware module and the replacement processor-specific firmware module.

16. The system of claim 15 wherein the updateable processor-specific firmware module in the electronic storage device is further updateable by
validating the content of the replacement processor-specific firmware module, and
removing the undateable processor-specific firmware module.

17. A machine-readable medium having one or mote instructions for initializing a system, which when executed by a processor, causes the processor to perform operations comprising:
providing a generic firmware module in a firmware image, the generic firmware module including instructions that are executable by multiple different processor types;
providing a firmware interface table which includes a plurality of fixed addresses for a like plurality of modules in the firmware image, the generic firmware module capable of searching the firmware interface table for processor-specific firmware modules;
wherein processor-specific firmware module is updateable by one or more further instructions which when executed by the processor, causes the processor to further perform operations comprising:

providing the processor-specific firmware module in the firmware image at a first fixed address provided in the firmware interface table while leaving one or more fixed addresses provided in the firmware interface table unused; and providing a replacement processor-specific firmware module for the processor-specific firmware module in the firmware image at a second fixed address in the firmware interface table selected from the one or more unused fixed addresses provided in the firmware interface table.

18. The machine-readable medium of claim 17 wherein the processor-specific firmware module is updateable by one or more instructions which when executed by a processor, causes the processor to perform operations further comprising:

validating the content of the replacement processor-specific firmware module.

19. The machine-readable medium of claim 17 wherein a processor-specific firmware module is updateable by one or more instructions which when executed by a processor, causes the processor to perform operations further comprising:

removing the processor-specific firmware module after validating the content of the replacement processor-specific firmware module.

20. The machine-readable medium of claim 17 wherein updating the first instance of the processor-specific firmware module includes one or more instructions which when executed by a processor, causes the processor to perform operations comprising:

providing the replacement processor-specific firmware module for the same processor type as the processor-specific firmware module.

21. The machine-readable medium of claim 17 wherein the generic firmware module in the data storage device includes one or more instructions for initializing the multiple different processor types.

22. The machine-readable medium of claim 17 wherein a processor-specific firmware module includes one or more instructions for initializing a particular processor type.

23. The machine-readable medium of claim 17 wherein the firmware interface table includes one or more length fields.

24. The machine-readable medium of claim 23 wherein the replacement processor-specific firmware module has a length that is within the length field associated with the second fixed address provided in the firmware interface table.

25. The device of claim 9 wherein the firmware interface table includes one or more length fields.

26. The device of claim 25 wherein the replacement processor-specific firmware module has a length that is within the length field associated with the second fixed address provided in the firmware interface table.

27. The system of claim 15 wherein the firmware interface table includes one or more length fields.

28. The system of claim 27 wherein the replacement processor-specific firmware module has a length that is within the length field associated with the second fixed address provided in the firmware interface table.

* * * * *

UNITED STATES PATENT AND TRADEMARK OFFICE
CERTIFICATE OF CORRECTION

PATENT NO. : 7,036,007 B2
APPLICATION NO. : 10/237349
DATED : April 25, 2006
INVENTOR(S) : Schelling et al.

It is certified that error appears in the above-identified patent and that said Letters Patent is hereby corrected as shown below:

In column 8, at line 66, delete "undateable" and insert --updateable--.
In column 9, at line 5, delete "undateable" and insert --updateable--.
In column 9, at line 14, delete "undateable" and insert --updateable--.
In column 9, at line 19, delete "undateable" and insert --updateable--.
In column 9, at line 53, delete "undateable" and insert --updateable--.
In column 9, at line 58, delete "undateable" and insert --updateable--.
In column 10, at line 26, delete "undateable" and insert --updateable--.
In column 10, at line 32, delete "undateable" and insert --updateable--.
In column 10, at line 48, delete "undateable" and insert --updateable--.
In column 10, at line 50, delete "mote" and insert --more--.
In column 10, at line 63, after "wherein", insert --a--.

Signed and Sealed this

Fourth Day of September, 2007

JON W. DUDAS
*Director of the United States Patent and Trademark Office*